United States Patent [19]

Nakahara et al.

[11] Patent Number: 5,068,256

[45] Date of Patent: Nov. 26, 1991

[54] BUBBLE-CONTAINING ETHYLENE/α-OLEFIN RUBBER

[75] Inventors: Takashi Nakahara; Toshiaki Kimura; Takashi Mishima, all of Ichihara, Japan

[73] Assignee: Mitsui Petrochemical Industries, Ltd., Tokyo, Japan

[21] Appl. No.: 420,883

[22] Filed: Oct. 13, 1989

[30] Foreign Application Priority Data

Oct. 14, 1988 [JP] Japan .................................. 63-258922
Sep. 22, 1989 [JP] Japan .................................. 1-247687

[51] Int. Cl.$^5$ ................................................ C08C 4/00
[52] U.S. Cl. ...................................... 521/150; 521/80; 521/142; 524/570; 526/336
[58] Field of Search .................. 521/80, 144, 150, 142; 528/483; 526/336; 264/50; 524/570

[56] References Cited

U.S. PATENT DOCUMENTS

| | | | |
|---|---|---|---|
| 3,580,867 | 5/1971 | Spenadel | 521/79 X |
| 3,855,378 | 12/1974 | Topcik | 521/144 X |
| 4,307,204 | 12/1981 | Vial | 521/140 |
| 4,458,723 | 7/1984 | Norjori et al. | 138/149 |
| 4,783,292 | 11/1988 | Rogers | 264/50 X |

Primary Examiner—Fred Teskin
Attorney, Agent, or Firm—Sherman & Shalloway

[57] ABSTRACT

In accordance with the present invention, there is provided a bubble-containing ehtylene/α-olefin rubber excellent in kneadability, characterized in that the ethylene/α-olefin rubber prepared by copolymerization of 50–95 mol% of ethylene, 5–50 mol% of α-olefin having at least 3 carbon atoms and 0–10 mol% of non-conjugated polyene contains 5–1000 parts by volume, based on 100 parts by volume of said rubber, of bubbles and has a water absorption volume as measured in accordance with ASTM D 1506 of less than 20% by volume of the total bubble volume.

7 Claims, No Drawings

BUBBLE-CONTAINING ETHYLENE/α-OLEFIN RUBBER

FIELD OF THE INVENTION

This invention relates to bubble-containing ethylene/α-olefin rubber and more particularly to bubble-containing ethylene/α-olefin rubber containing a high percentage of independent bubbles, excellent in kneadability and less in decrease of kneadability on storing.

BACKGROUND OF THE INVENTION

Because of excellent weatherability, ozone resistance and heat resistance, ethylene/α-olefin rubber is utilized in manufacturing automotive parts, construction materials, electric wires and industrial parts. When ethylene/α-olefin rubber is used for such purposes as mentioned above, the rubber is mixed with reinforcing materials such as carbon black, fillers such as talc and clay, and compounding additives such as various softeners, vulcanizing accelerators, and vulcanizers, and the resulting mixture is kneaded in the same manner as in common rubber using a batch-wise kneading machine such as Banbury mixer or various extruders.

Since the kneading operation as mentioned above requires large energy and much time, it follows that the kneading cost necessary therefor occupies a very large proportion in the overall processing costs. Recently, in the light of the foregoing, ethylene/α-olefin rubber has come to be used widely, said rubber having a high ethylene content and a high Mooney viscosity and being difficult to knead. With the view of improving this ethylene/α-olefin rubber in kneadability, a so-called friable bale developed by inclusion in said rubber of gas has been put on the market.

In the conventional friable bale, however, there was such a drawback that because the bubbles are formed normally in a continuous state, the gas retained in said bubbles is deflated under continuous load by said bale itself and consequently the bale deteriorates in kneadability.

OBJECT OF THE INVENTION

The present invention is intended to solve such problems associated with the prior art as mentioned above, and an object of the invention is to provide bubble-containing ethylene/α-olefin rubber having quite excellent kneadability and suffering from deterioration in its kneadability on storing, if any, only to a slight extent.

SUMMARY OF THE INVENTION

The bubble-containing ethylene/α-olefin rubber of the present invention is characterized in that the ethylene/α-olefin rubber prepared as a base by copolymerization of 50-95 mol % of ethylene, 5-50 mol % of α-olefin having at least 3 carbon atoms and 0-10 mol % of non-conjugated polyene contains 5-1000 parts by volume, based on 100 parts by volume of said rubber, of bubbles and has a water absorption volume, as measured in accordance with ASTM D 1506, of less than 20% by volume of the total volume of bubbles.

DETAILED DESCRIPTION OF THE INVENTION

The bubble-containing ethylene/α-olefin rubber of the present invention is illustrated below in detail.

Ethylene/α-olefin rubber used as a base in the invention is bipolymer, terpolymer or multicomponent polymer rubber consisting essentially of ethylene/α-olefin or ethylene/α-olefin/non-conjugated polyene (hereinafter called sometimes EPT for short).

The α-olefin of at least 3 carbon atoms used as one component of EPT used in the present invention includes concretely α-olefin of 3-20 carbon atoms selected from among propylene, 1-butene, 1-pentene, 1-hexene, 4-methyl-1-pentene, 1-octene, 1-decene and mixtures thereof.

The non-conjugated polyene used includes concretely chain non-conjugated dienes such as 1,4-hexadiene, 1,6-octadiene and 5-methyl-1,4-hexadiene, cyclic non-conjugated diene such as cyclohexadiene, dicyclopentadiene, methyltetrahydroindene, 5-vinylnorbornene, 5-ethylidene-2-norbornene and 5-isopropylidene-2-norbornene, and trienes such as 2,8-diisopropylidene-5-norbornene, 2-propenyl-2,2-norbornadiene and 1,3,7-octatriene. Of these mentioned above, particularly preferred are dicyclopentadiene, 5-ethylidene-2-norbornene, 5-vinyl-2-norbornene and 1,4-hexadiene, and these may be used either singly or in combination.

EPT used in the present invention is a copolymer rubber prepared by copolymerization of 50-95 mol %, preferably 60-90 mol % of ethylene, 5-50 mol %, preferably 10-40 mol % of α-olefin and 0-10 mol %, preferably 0-4 mol % of non-conjugated polyene, and has a Mooney viscosity (ML $_{1+4}$' 100° C.) of preferably 5-300.

The bubble-containing ethylene/α-olefin rubber of the present invention may contain mineral oil such as process oil.

Gases used for constituting bubbles contained in the bubble-containing ethylene/α-olefin rubber of the present invention include substances which are in a gaseous phase at ordinary temperatures and normal pressures, such as air, nitrogen gas, helium gas, carbon dioxide, oxygen gas and hydrogen gas and, in addition thereto, there may also be used vapor of water, various organic solvents and other substances. Of these mentioned above, preferred is a non-toxic and non-combustible gas such as nitrogen gas and helium gas.

As a procedure for making the above-mentioned gas present in ETP as an independent bubble, there may be used, for example, a commonly known method wherein EPT is heated to bring to a softened state, and the EPT thus softened is kneaded while blowing said gas thereinto and extruded by means of an extrusion machine, followed by cooling. In said instance, however, there may also be used other methods suitable for the purpose intended.

The bubble-containing ethylene/α-olefin rubber of the present invention contains 5-1000 parts by volume of bubbles, preferably 10-50 parts by volume of bubbles based on 100 parts by volume of the ethylene/α-olefin rubber used as a base rubber.

In the bubble-containing ethylene/α-olefin rubber, there may be used an ethylene/α-olefin rubber containing mineral oil such as process oil as the base rubber. In this case, the bubble-containing ethylene/α-olefin rubber of the invention contains 5-1000 parts by volume, preferably 10-50 parts by volume of the bubbles based on 100 parts by volume of the sum of the ethylene/α-olefin rubber and the mineral oil.

In the bubble-containing ethylene/α-olefin rubber of the present invention, the bubbles contained therein are preferably independent bubbles.

In this connection, independency of bubble contained in a bubble-containing rubber can generally be judged by means of a water absorption amount of the bubble containing rubber when it comes in contact with water, and the smaller is the water absorption amount, the larger is the amount of independent bubbles. In the present invention, the water absorption volume, which is a value obtained by conversion of the water absorption amount as measured by Water Absorption Test prescribed in ASTM D 1506 into volume, is less than 20% by volume, preferably less than 10% by volume and further preferably less than 5% by volume based on the total volume of the bubbles.

In the present specification, the total volume of the bubbles contained in the bubble-containing ethylene/α-olefin rubber may be obtained according to the following equation.

Total volume of bubbles =

$$\frac{\text{Bubble-containing ethylene/}\alpha\text{-olefin rubber}}{\text{Apparent specific gravity of ethylene/}\alpha\text{-olefin rubber}} -$$

$$\frac{\text{Weight of bubble containing ethylene/}\alpha\text{-olefin rubber}}{\text{True specific gravity of ethylene/}\alpha\text{-olefin rubber}}$$

When the bubble-containing ethylene/α-olefin rubber of the present invention is mixed, in the same manner as in conventional rubber, with compounding agents such as reinforcing materials such as carbon black, fillers such as talc and clay, various softeners, vulcanizing accelerators and vulcanizers, and the resulting mixture is kneaded with a batch-wise kneading machine such as Banbury mixer or other various extrusion machines, whereby a compounded rubber is prepared.

In the bubble-containing rubber of the present invention, the kneading operation required can be carried out in a short time and with a small consumption of electric power in comparison with the conventional ethylene/α-olefin rubber, and the gas contained therein is hardly deflated on storing, and deterioration in kneadability of the rubber is small. Furthermore, the bubbles contained in the bubble-containing ethylene/α-olefin rubber of the invention are dissipated into other compounding agents when the rubber is kneaded with other compounding agents, and no bubble remains in the resulting compounded rubber.

The compounded rubber thus obtained is usually cured by vulcanization, and then used as a rubber product.

EFFECTS OF THE INVENTION

The bubble-containing ethylene/α-olefin rubber of the present invention contains bubbles having a high independency, and hence it is excellent in kneadability and can be kneaded in a short time with a small consumption of electric power and also is less in deterioration in kneadability on storing.

The present invention is illustrated below with reference to examples, but it should be construed that the invention is in no way limited to those examples.

EXAMPLE 1-4 AND COMPARATIVE EXAMPLES 1-2

An ethylene/propylene/ethylidene norbornene copolymer rubber (hereinafter called EPT-1 for short) having an ethylene content of 79 mol %, iodine value of 10 and Mooney viscosity [$ML_{1+4}$ (100° C.)] of 80 was kneaded and extruded by means of an extrusion machine TEX 65 (a trade name) of Nippon Seiko K. K. at a polymer temperature of 300° C., while blowing nitrogen gas into the polymer within the extrusion machine to obtain a bubble-containing ethylene/α-olefin rubber containing 10–40% by volume, based on the polymer volume, of bubbles consisting of nitrogen gas and a water absorption (based on the total bubble volume) of 1–4% by volume.

The bubble-containing ethylene/α-olefin rubber thus obtained was subjected to accelerated test corresponding to immediately after the extrusion and 3-month storage, and thereafter 100 parts by weight of this rubber was mixed with 80 parts by weight of FEF carbon black, 60 parts by weight of calcium bicarbonate, 80 parts by weight of process oil, 5 parts by weight of zinc white and 1 part by weight of stearic acid, and the resulting mixture was kneaded by means of a mixer, Mixtron 2 Model (a trade name) of Kobe Seiko K. K. to obtain a sheet-like compounded rubber having a thickness of 1 mm.

Dispersed state of the components of the compounded rubber was visually observed to judge kneadability of said rubber.

Conventional EPT-1 containing practically no gas as Comparative Example 1 and friable bale of EPT-1 containing continuous bubble as Comparative Example 2 were subjected to the same test as above.

Results obtained are shown in Table 1.

TABLE 1

|  | Example | | | | Compar. Example | |
|---|---|---|---|---|---|---|
|  | 1 | 2 | 3 | 4 | 1 | 2 |
| Immediately after preparation of specimen | | | | | | |
| Amount of gas contained[0] | 10 | 20 | 30 | 40 | 0 | 20 |
| Water absorption (V %)[1] | 1 | 3 | 3 | 4 | 0 | 60 |
| Kneadability[2] | Passable | Good | Good | Good | Bad | Good |
| After accelerated test[3] | | | | | | |
| Amount of gas contained (v %) | 8 | 18 | 27 | 38 | 0 | 6 |
| Kneadability (min.)[2] | Passable | Good | Good | Good | Bad | Passable |
| Time required for | 7 | 3 | 3 | 2 | 10 | 7 |

TABLE 1-continued

|  | Example | | | | Compar. Example | |
| --- | --- | --- | --- | --- | --- | --- |
|  | 1 | 2 | 3 | 4 | 1 | 2 |
| Banbury mixing (min.) | | | | | | |

Notes
[0] Parts by volume based on 100 parts by volume of base rubber
[1] Measured in accordance with ASTM D 1506.
[2] Kneadability
Kneading conditions, as follows:
Mixtron BB2 mixer (a trade name, Kobe Seiko K.K.)
Ram pressure: 1.7 kg/cm$^2$
Filling ratio: 65%
Feeding of compounding agent: Poured at time.
Compounding: Polymer (100)/FEF carbon black (80)/calcium bicarbonate (60)/oil (80)/zinc white (5)/stearic acid (1)
Evaluation standard is as follows:
Good; Good dispersion.
Passable; Observed polymer lumps of less than 1 mm in diameter.
Bad; Observed polymer lumps of larger than 1 mm in diameter.
[3] Accelerated test
Storing conditions: 70° C. for 2 days under continuous load of 40 g/cm$^2$ From the foregoing results, it is understood that the specimens of the Examples of the invention are all excellent in kneadability and storability, whereas that of Comparative Example 1 is poor in kneadability and that of Comparative Example 2 is poor in storability.

What is claimed is:

1. A storage-stable, non-vulcanized, easily-kneadable bubble-containing ethylene/α-olefin rubber composition consisting essentially of
   (A) a base rubber comprising a copolymer of
      (1) from about 50 to 95 mol % of ethylene;
      (2) about 5 to 50 mol % of α-olefin having at least 3 carbon atoms; and
      (3) about 0 to 10 mol % of nonconjugated polyene; and
   (B) containing 5-1000 parts by volume, based on 100 parts by volume of said base rubber, of bubbles and providing a water absorption volume as measured in accordance with ASTM D 1506 of less than 20% by volume of the total volume of bubbles.

2. The bubble-containing ethylene/α-olefin rubber as claimed in claim 1 wherein 10-50 parts by volume, based on 100 parts by volume of the rubber, of bubbles are contained.

3. The bubble-containing ethylene/α-olefin rubber as claimed in claim 1 wherein the water absorption volume as measured in accordance with ASTM D 1506 is less than 10% by volume of the total bubble volume.

4. The bubble-containing ethylene/α-olefin rubber as claimed in claim 1 wherein the ethylene/α-olefin rubber is prepared by copolymerization of 60-90 mol % of ethylene, 10-40 mol % of a α-olefin having at least 3 carbon atoms and 0-4 mol % of nonconjugated polyene.

5. The rubber composition of claim 1 further containing mineral oil.

6. The rubber composition of claim 1 wherein the bubbles are comprised of a substance which is in the gaseous phase at ordinary temperatures and pressures.

7. The rubber composition of claim 6 wherein the bubbles are comprised of nitrogen gas.

* * * * *

UNITED STATES PATENT AND TRADEMARK OFFICE
CERTIFICATE OF CORRECTION

PATENT NO. : 5,068,256

DATED : Nov. 26, 1991

INVENTOR(S) : TAKASHI NAKAHARA, ET AL.

It is certified that error appears in the above-identified patent and that said Letters Patent is hereby corrected as shown below:

At column 4, line 33, change "calcium bicarbonate" to --heavy calcium carbonate--.

At column 4, Table 1, change "Kneadability (min.)$^2$" to --Kneadability$^2$--.

At column 5, Table 1-continued, footnote 2, change "calcium bicarbonate" to --heavy calcium carbonate--.

Signed and Sealed this

Twenty-eighth Day of December, 1993

Attest:

BRUCE LEHMAN

*Attesting Officer*   *Commissioner of Patents and Trademarks*